United States Patent
Reial et al.

(10) Patent No.: US 10,284,315 B2
(45) Date of Patent: May 7, 2019

(54) CONFIGURATION AND REPORTING OF MOBILITY MEASUREMENTS

(71) Applicant: Telefonaktiebolaget LM Ericsson (publ), Stockholm (SE)

(72) Inventors: Andres Reial, Malmo (SE); Johan Rune, Lidingo (SE); Henrik Sahlin, Molnlycke (SE); Icaro L. J. Da Silva, Solna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 11 days.

(21) Appl. No.: 15/525,314

(22) PCT Filed: Mar. 24, 2016

(86) PCT No.: PCT/EP2016/056500
§ 371 (c)(1),
(2) Date: May 9, 2017

(87) PCT Pub. No.: WO2017/162287
PCT Pub. Date: Sep. 28, 2017

(65) Prior Publication Data
US 2018/0083722 A1    Mar. 22, 2018

(51) Int. Cl.
*H04W 24/00* (2009.01)
*H04B 17/382* (2015.01)
(Continued)

(52) U.S. Cl.
CPC .......... *H04B 17/382* (2015.01); *H04W 24/08* (2013.01); *H04B 17/30* (2015.01);
(Continued)

(58) Field of Classification Search
CPC .... H04B 17/30; H04B 17/318; H04B 17/345; H04B 17/382; H04W 24/08; H04W 88/02
See application file for complete search history.

(56) References Cited

U.S. PATENT DOCUMENTS

| 8,897,702 B2 | 11/2014 | Niu et al. |
| 9,450,661 B2 | 9/2016 | Yu et al. |

(Continued)

FOREIGN PATENT DOCUMENTS

| EP | 1545149 A2 | 6/2005 |
| EP | 1835774 A1 | 9/2007 |

(Continued)

OTHER PUBLICATIONS

Final Office Action dated Dec. 5, 2017 in connection with U.S. Appl. No. 14/441,211, 42 pages.

(Continued)

*Primary Examiner* — Mohamed A Kamara
(74) *Attorney, Agent, or Firm* — Leffler Intellectual Property Law, PLLC

(57) ABSTRACT

There is provided mechanisms for configuring mobility measurements. A method is performed by a network node. The method comprises obtaining parameters to be used for a mobility measurement procedure. The parameters are valid for at least two consecutive measurement sessions of the mobility measurement procedure. The method comprises providing a measurement order to a wireless device regarding the mobility measurement procedure. The measurement order comprises at least one of the parameters. The method comprises initiating transmission of mobility reference signals to the wireless device according to the parameters such that the mobility reference signals are transmitted during said at least two consecutive measurement sessions. There is also provided mechanisms for reporting such mobility measurements.

32 Claims, 4 Drawing Sheets

(51) Int. Cl.
*H04W 24/08* (2009.01)
*H04W 88/02* (2009.01)
*H04B 17/30* (2015.01)
*H04B 17/318* (2015.01)
*H04B 17/345* (2015.01)

(52) U.S. Cl.
CPC .......... *H04B 17/318* (2015.01); *H04B 17/345* (2015.01); *H04W 88/02* (2013.01)

(56) References Cited

U.S. PATENT DOCUMENTS

| | | | |
|---|---|---|---|
| 9,780,933 B2 * | 10/2017 | Tsuboi | H04L 5/0048 |
| 2004/0219926 A1 * | 11/2004 | Kim | H04W 36/0088 455/452.2 |
| 2005/0037799 A1 | 2/2005 | Braun et al. | |
| 2008/0144522 A1 * | 6/2008 | Chang | H04B 7/15542 370/252 |
| 2009/0111469 A1 | 4/2009 | Lee et al. | |
| 2010/0029278 A1 | 2/2010 | Fang et al. | |
| 2010/0127931 A1 | 5/2010 | Rensburg et al. | |
| 2010/0303034 A1 | 12/2010 | Chen et al. | |
| 2011/0110453 A1 | 5/2011 | Prasad et al. | |
| 2011/0134871 A1 | 6/2011 | Nogami et al. | |
| 2011/0218016 A1 | 9/2011 | Hirakawa et al. | |
| 2013/0051364 A1 | 2/2013 | Seol et al. | |
| 2013/0065612 A1 | 3/2013 | Siomina et al. | |
| 2013/0155847 A1 | 6/2013 | Li et al. | |
| 2013/0215857 A1 | 8/2013 | Wu et al. | |
| 2013/0272263 A1 | 10/2013 | Pi et al. | |
| 2014/0036809 A1 | 2/2014 | Xu et al. | |
| 2014/0073329 A1 | 3/2014 | Kang et al. | |
| 2014/0146788 A1 | 5/2014 | Wallertin et al. | |
| 2014/0334566 A1 | 11/2014 | Kim et al. | |
| 2015/0124732 A1 | 5/2015 | Seo et al. | |
| 2015/0163687 A1 | 6/2015 | Lee et al. | |
| 2016/0150435 A1 * | 5/2016 | Baek | H04W 16/28 370/252 |
| 2016/0197659 A1 | 7/2016 | Yu et al. | |
| 2017/0034742 A1 * | 2/2017 | Roa | H04W 24/08 |
| 2017/0311195 A1 * | 10/2017 | Martin | H04W 16/14 |
| 2017/0374574 A1 * | 12/2017 | Lee | H04W 16/24 |
| 2018/0132204 A1 * | 5/2018 | Siomina | H04W 24/10 |

FOREIGN PATENT DOCUMENTS

| | | |
|---|---|---|
| WO | 200800134219 A1 | 11/2008 |
| WO | 2010032791 A1 | 3/2010 |
| WO | 2013006105 A1 | 1/2013 |
| WO | 20130028128 A1 | 2/2013 |
| WO | 2014010963 A1 | 1/2014 |
| WO | 2015171166 A1 | 11/2015 |
| WO | 2016003336 A1 | 1/2016 |
| WO | 2016013698 A1 | 1/2016 |
| WO | 2016045695 A1 | 3/2016 |
| WO | 2016095984 A1 | 6/2016 |

OTHER PUBLICATIONS

PCT International Search Report, dated Aug. 21, 2015, in connection with International Application No. PCT/EP2014/078235, all pages.
PCT Written Opinion, dated Aug. 21, 2015, in connection with International Application No. PCT/EP2014/078235, all pages.
PCT International Search Report, dated Jun. 17, 2015, in connection with Application No. PCT/EP2014/070188, all pages.
PCT Written Opinion, dated Jun. 17, 2015, in connection with International Application No. PCT/EP2014/070188, all pages.
Jihoon Lee et al., Dynamic Beamforming Handover Mechanism Using Neighbor Profile in IEEE 802.11 Wireless LANs, International Journal of Advancements in Computing Technology, vol. 5, No. 11, Jul. 2013, pp. 40-47.
Alcatel, 3GPP TSG RAN WG1 #36, R1-040195, Fast Beam Selection in Soft Handover, Malaga, Spain, Feb. 16-20, 2004, pp. 1-4.
Non-Final Office Action issued Nov. 3, 2016 in connection with U.S. Appl. No. 14/769,799, 16 pages.
Non-Final Office Action dated May 18, 2017 in connection with U.S. Appl. No. 14/441,211, 40 pages.
PCT International Search Report, dated Nov. 21, 2016, in connection with International Application No. PCT/EP2016/056500, all pages.
PCT Written Opinion, dated Nov. 21, 2016, in connection with International Application No. PCT/EP2016/056500, all pages.
Japanese Office Action, dated Jul. 27, 2018, in connection with Japanese Application No. 2017-530179, 4 pages.
English language summary of Japanese Office Action, dated Jul. 27, 2018, in connection with Japanese Application No. 2017-530179, 3 pages.

* cited by examiner

CONFIGURATION AND REPORTING OF MOBILITY MEASUREMENTS

TECHNICAL FIELD

Embodiments presented herein relate to a method, a network node, a computer program, and a computer program product for configuring mobility measurements. Further embodiments presented herein relate to a method, a wireless device, a computer program, and a computer program product for reporting mobility measurements.

BACKGROUND

In communications networks, there may be a challenge to obtain good performance and capacity for a given communications protocol, its parameters and the physical environment in which the communications network is deployed.

For example, in legacy, cell-based communications networks such as according to the 3rd Generation. Partnership Project (3GPP) Long Term Evolution (LTE) radio access, reference signals that are utilized by wireless devices served by the communications network to perform measurements on neighbor cell candidates are broadcasted in an always-on manner, regardless of the presence or position of the wireless devices. These signals are easy to measure and yield consistent results, but the static signaling leads to a high network resource usage, interference, and energy consumption. Mobility measurement reports are sent by the wireless devices when some criteria is fulfilled e.g. target quality is larger than source quality plus an offset, where the offset is controlled to avoid too many unnecessary reports.

However, there is still a need for an improved configuration of mobility measurements.

SUMMARY

An object of embodiments herein is to provide efficient configuration of mobility measurements.

According to a first aspect there is presented a method for configuring mobility measurements. The method is performed by a network node. The method comprises obtaining parameters to be used for a mobility measurement procedure. The parameters are valid for at least two consecutive measurement sessions of the mobility measurement procedure. The method comprises providing a measurement order to a wireless device regarding the mobility measurement procedure. The measurement order comprises at least one of the parameters. The method comprises initiating transmission of mobility reference signals to the wireless device according to the parameters such that the mobility reference signals are transmitted during said at least two consecutive measurement sessions.

According to a second aspect there is presented a network node for configuring mobility measurements. The network node comprises processing circuitry. The processing circuitry is configured to cause the network node to obtain parameters to be used for a mobility measurement procedure. The parameters are valid for at least two consecutive measurement sessions of the mobility measurement procedure. The processing circuitry is configured to cause the network node to provide a measurement order to a wireless device regarding the mobility measurement procedure. The measurement order comprises at least one of the parameters. The processing circuitry is configured to cause the network node to initiate transmission of mobility reference signals to the wireless device according to the parameters such that the mobility reference signals are transmitted during said at least two consecutive measurement sessions.

According to a third aspect there is presented a network node for configuring mobility measurements. The network node comprises processing circuitry and a computer program product. The computer program product stores instructions that, when executed by the processing circuitry, causes the network node to perform steps, or operations. The steps, or operations, cause the network node to obtain parameters to be used for a mobility measurement procedure. The parameters are valid for at least two consecutive measurement sessions of the mobility measurement procedure.

The steps, or operations, cause the network node to provide a measurement order to a wireless device regarding the mobility measurement procedure. The measurement order comprises at least one of the parameters. The steps, or operations, cause the network node to initiate transmission of mobility reference signals to the wireless device according to the parameters such that the mobility reference signals are transmitted during said at least two consecutive measurement sessions.

According to a fourth aspect there is presented a network node for configuring mobility measurements. The network node comprises an obtain module configured to obtain parameters to be used for a mobility measurement procedure. The parameters are valid for at least two consecutive measurement sessions of the mobility measurement procedure. The network node comprises a provide module configured to provide a measurement order to a wireless device regarding the mobility measurement procedure. The measurement order comprises at least one of the parameters. The network node comprises a transmit module configured to initiate transmission of mobility reference signals to the wireless device according to the parameters such that the mobility reference signals are transmitted during said at least two consecutive measurement sessions.

According to a fifth aspect there is presented a computer program for configuring mobility measurements, the computer program comprising computer program code which, when run on processing circuitry of a network node, causes the network node to perform a method according to the first aspect.

According to a sixth aspect there is presented a method for reporting mobility measurements. The method is performed by a wireless device. The method comprises receiving a measurement order from a network node regarding a mobility measurement procedure. The measurement order comprises at least one parameter to be used for the mobility measurement procedure. The at least one parameter is valid for at least two consecutive measurement sessions of the mobility measurement procedure. The method comprises receiving the mobility reference signals from the network node according to the at least one parameter during the at least two consecutive measurement sessions.

According to a seventh aspect there is presented a wireless device for reporting mobility measurements. The wireless device comprises processing circuitry. The processing circuitry is configured to cause the wireless device to receive a measurement order from a network node regarding a mobility measurement procedure. The measurement order comprises at least one parameter to be used for the mobility measurement procedure. The at least one parameter is valid for at least two consecutive measurement sessions of the mobility measurement procedure. The processing circuitry is configured to cause the wireless device to receive the mobility reference signals from the network node according to the at least one parameter during the at least two consecutive measurement sessions.

According to an eighth aspect there is presented a wireless device for reporting mobility measurements. The wireless device comprises processing circuitry and a computer program product. The computer program product stores instructions that, when executed by the processing circuitry, causes the wireless device to perform steps, or operations. The steps, or operations, cause the wireless device to receive a measurement order from a network node regarding a mobility measurement procedure. The measurement order comprises at least one parameter to be used for the mobility measurement procedure. The at least one parameter is valid for at least two consecutive measurement sessions of the mobility measurement procedure. The steps, or operations, cause the wireless device to receive the mobility reference signals from the network node according to the at least one parameter during the at least two consecutive measurement sessions.

According to a ninth aspect there is presented a wireless device for reporting mobility measurements. The wireless device comprises a receive module configured to receive a measurement order from a network node regarding a mobility measurement procedure. The measurement order comprises at least one parameter to be used for the mobility measurement procedure. The at least one parameter is valid for at least two consecutive measurement sessions of the mobility measurement procedure. The wireless device comprises a receive module configured to receive the mobility reference signals from the network node according to the at least one parameter during the at least two consecutive measurement sessions.

According to a tenth aspect there is presented a computer program for reporting mobility measurements, the computer program comprising computer program code which, when run on processing circuitry of a wireless device, causes the wireless device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, these network nodes, these wireless devices, and these computer programs provide efficient configuration of mobility measurements and efficient reporting of mobility measurements.

Advantageously, the proposed configuration of mobility measurements reduces the downlink signaling load, reduces interference created for other wireless devices, and reduces the impact on the network of the mobility monitoring process.

Advantageously, the proposed reporting of mobility measurements reduces the uplink control signaling load and reduces the corresponding capacity impact, as well as the interference.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do riot have to be performed in the exact order disclosed, unless explicitly stated.

BRIEF DESCRIPTION OF THE DRAWINGS

Further details, embodiments and advantages and of the present disclosure are now described, by way of example, with reference to the accompanying drawings, in which.

DETAILED DESCRIPTION

Embodiments will now be described more fully hereinafter with reference to the accompanying drawings. The concept may, however, be embodied in many different forms and should not be construed as limited to the embodiments set forth herein; rather, these embodiments are provided by way of example so that this disclosure will be thorough and complete, and will fully convey the scope of the disclosure to those skilled in the art. Like numbers refer to like elements throughout the description. Any step or feature illustrated by dashed lines should be regarded as optional.

Figure 1:
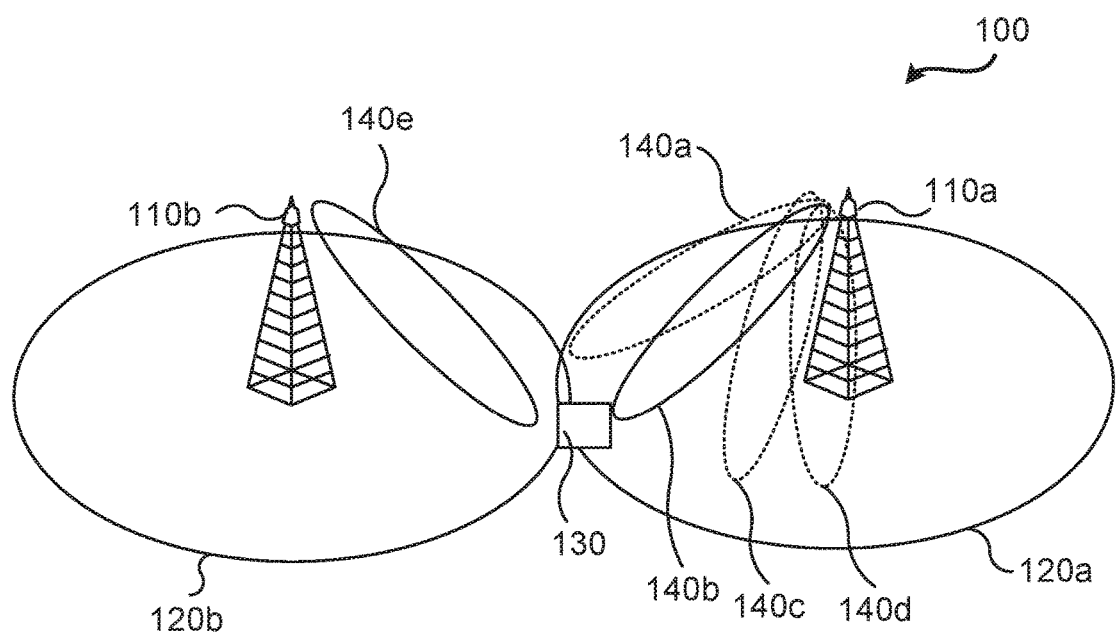
FIG. 1 is a schematic diagram illustrating a communication network according to embodiments.

FIG. 1 is a schematic diagram illustrating a communications network 100 where embodiments presented herein can be applied. The communications network 100 comprises network nodes 110a, 110b. Each network node could be a radio access network node, a radio base station, a base transceiver station, a node B, an evolved node B, an access point (AP), or an access node (AN). Each network nodes 110a, 110b provides network coverage in a serving area 120a, 120b by means of transmitting and receiving signals in transmission beams 140a-140e. According to the illustrative example of FIG. 1, the network nodes 110a is configured to transmit and receive signals in transmission beams 140a-140d, where transmission beam 140b currently is the active, and thus serving, transmission beam. A wireless device 130 is by means of communicating with the network nodes 110a, 110b in the transmission beams 140a-140e enabled to access services and exchange data with a service network part (not illustrated) of the communications network 100. The wireless device 130 could be a portable wireless device, a mobile station, a mobile phone, a handset, a wireless local loop phone, a user equipment (UE), a smartphone, a laptop computer, a tablet computer, a network interface equipped sensor device, an Internet of things device, or a wireless dongle.

In beamforming-based communications networks, it could be beneficial to avoid always-on signaling. Instead the network can turn on mobility reference signals (MRS) in a device-specific manner, and only in relevant candidate transmission beams. Device-specific mobility reference signals can by the wireless device 130 be used to track its best transmission beam while in a dormant mode. The candidate transmission beams are typically selected from a fixed grid of transmission beams. Measurements to be performed at a given wireless device 130 are ordered by the network when the network determines that a beam update for the given wireless device 130 may be needed, e.g. when a decreasing serving transmission beam quality is detected due to movement of the given wireless device 130, or when the given wireless device 130 needs to acquire a serving transmission beam when accessing a new frequency band for the first time. The candidate transmission beams may be transmitted from a single radio access node or from several radio access nodes. The network informs the wireless device 130 via downlink control (i.e., from radio access node to wireless device 130) or via a radio resource control (RRC) channel to measure and report candidate transmission beam transmission quality, optionally including a list of mobility reference signals for the wireless device 130 to measure on. The measurement command also informs the wireless device 130 of the time/frequency (T/F) location of the mobility reference signals to be measured, since mobility reference signals are transmitted in a narrow frequency range, not across the entire signal bandwidth. Once the wireless device 130 has performed mobility measurements and reported the results, the network turns the candidate transmission beams off again.

To detect degradation of the serving beam quality in a timely manner and to determine whether a mobility measurement session needs to be initiated, the network uses quality reports for the wireless link currently serving the wireless device. While data transmission for the wireless device is ongoing, Channel State Information Reference Signals (CSI-RS) feedback may be used to monitor the link quality without any mobility reference signal overhead. In other modes, e.g. when the wireless device is not scheduled for data, MRS-based mobility measurement mechanism may be used to occasionally check the current serving beam quality. In such a case, usually the only candidate transmission beam where the mobility reference signal is activated is the current serving beam.

While the mobility reference signals in candidate transmission beams can be turned on only when the mobility session is triggered based on the serving beam quality change, in some scenarios, the mobility reference signals in candidate transmission beams may also be activated alongside the serving beam for continuous quality comparison.

In beamforming-based communications networks, a self-contained signal design could be used. With such a self-contained signal design, signals or information transmitted in an individual beam should be detectable without requiring prior or simultaneous receptions of signals in other beams or from other transmission points. In some cases, the signals are self-contained, subject to a previous reception of configuration information, e.g. T/F resources where the mobility reference signals transmission is located. Such information, e.g. T/F allocation for the mobility reference signals, may be e.g. specified in a standard document or signaled to the wireless device via control channel messages.

In many foreseeable scenarios, the wireless device may have low mobility or be semi-static. Then most of the monitoring mobility measurements do not provide significant new information to the network but only consume network resources in the form of measurement request and mobility reference signal resource allocation signaling in the downlink control channel and measurement report signaling in the uplink (i.e., from wireless device 130 to radio access node) control channel.

Even when the channel conditions vary due to movement of the wireless device, the monitoring measurement and reporting configuration, as well as the period, often remain constant. Thus, the operation of sending measurement orders to the wireless device constitutes an overhead that provides limited information to the wireless device in such cases.

In some beamforming-based communications networks the mobility reference signals are always scheduled per-device, per measurement session, and using dedicated signaling, and assumes that the wireless device 130 reports every measurement session. There are currently no established mechanisms for using on-demand activation of mobility reference signals.

The embodiments disclosed herein thus relate to mechanisms for configuring and reporting mobility measurements. In order to obtain such mechanisms there is provided a network node 110a, 110b, a method performed by the network node 110a, 110b, a computer program product comprising code, for example in the form of a computer program, that when run on processing circuitry of the network node 110a, 110b, causes the network node 110a, 110b to perform the method. In order to obtain such mechanisms there is further provided a wireless device 130, a method performed by the wireless device 130, and a computer program product comprising code, for example in the form of a computer program, that when run on processing circuitry of the wireless device 130, causes the wireless device 130 to perform the method.

Figure 2:
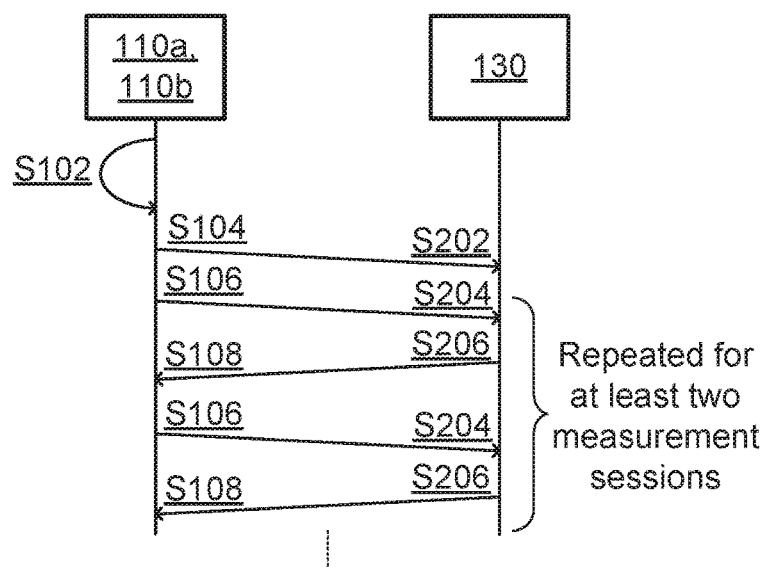
FIG. 2 is a signalling diagram according to embodiments.
Figure 3:
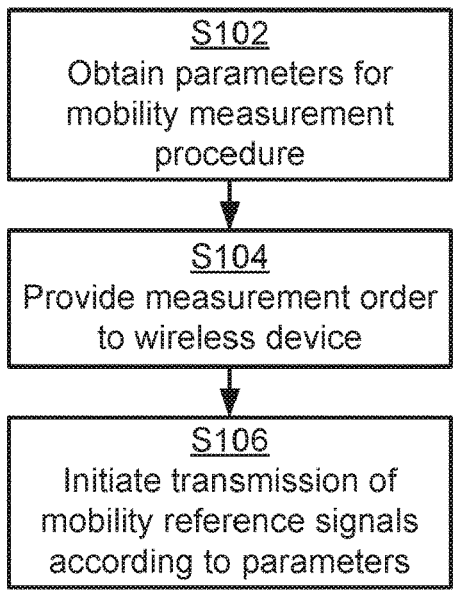
FIGS. 3, 4, 5, 6, and 10 are flowcharts of methods according to embodiments.
Figure 4:
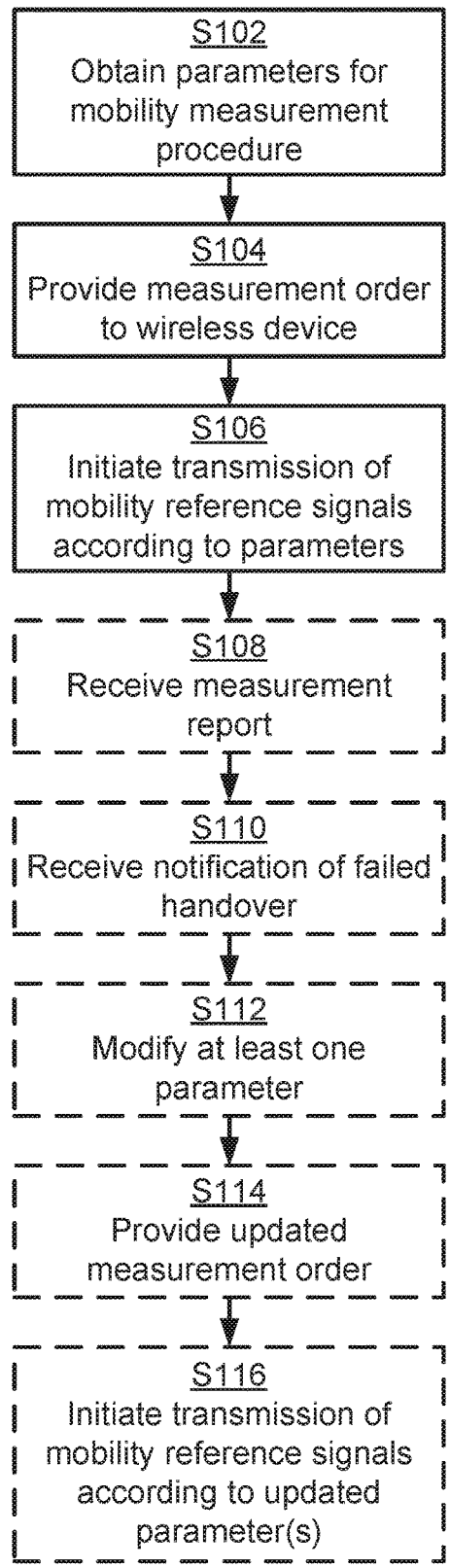
Figure 5:
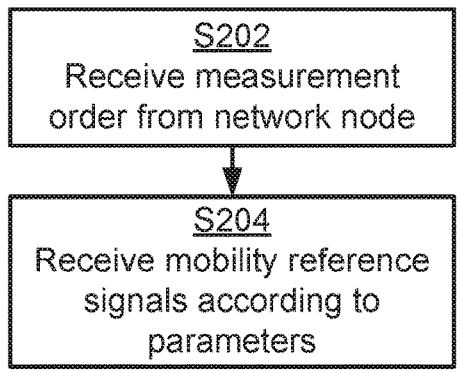
Figure 6:
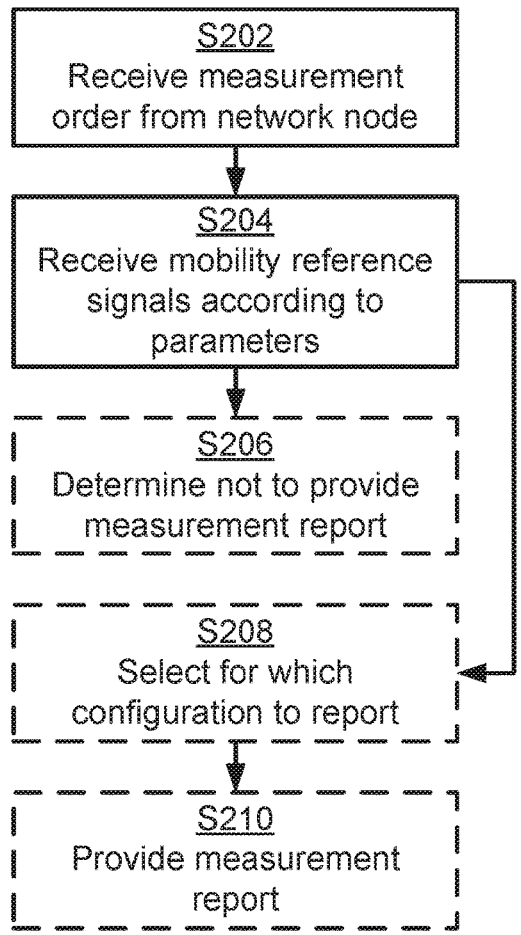

FIG. 2 is a signalling diagram according to embodiments. FIGS. 3 and 4 are flow charts illustrating embodiments of methods for configuring mobility measurements as performed by the network node 110a, 110b. FIGS. 5 and 6 are flow charts illustrating embodiments of methods for reporting mobility measurements as performed by the wireless device 130. The methods are advantageously provided as computer programs 420a, 420b.

Reference is now made to FIG. 3 illustrating a method for configuring mobility measurements as performed by the network node 110a, 110b according to an embodiment. Parallel reference is also made to the signalling diagram of FIG. 2

S102: The network node 110a, 110b obtains parameters to be used for a mobility measurement procedure. The parameters are valid for at least two consecutive measurement sessions of the mobility measurement procedure. Examples of such parameters will be disclosed below.

Having Obtained the parameters the network node 110a, 110b orders the wireless device 130 to perform mobility measurements. In order to do so the network node 110a, 10b performs step S104:

S104: The network node 110a, 110b provides a measurement order to the wireless device 130 regarding the mobility measurement procedure. The measurement order comprises at least one of the parameters.

The wireless device 130 is thereby made explicitly aware that the mobility measurement procedure concerns at least two consecutive measurement sessions and can be prepared to take part in the mobility measurement procedure accordingly. The network node 110a, 110b then performs step S106:

S106: The network node 110a, 110b initiates transmission of the mobility reference signals to the wireless device 130 according to the parameters. The network node transmits the mobility reference signals during the at least two consecutive measurement sessions.

In this respect, there will typically be multiple measurements performed on a single transmission beam 140e (as for network node 110b) or multiple transmission beams 140a, 140n, 140c, 140d (as for network node 110a). The term measurement session is therefore to be interpreted as a single measurement on a single mobility reference signal. A measurement session thus refers to the measurements according to the measurement order and that this measurement session is repeated at least two times in accordance with a semi-persistent scheduling (see below). There may be gaps between the individual measurement sessions so that the wireless device 130 does not have to perform continuous measurements of mobility reference signals.

As in step S106, one network node 110a, 110b initiates transmission of the mobility reference signals to the wireless device 130. In this respect, all the mobility reference signals do not need to be actually transmitted in transmission beams of the same network node 110a, 110b. That is, the herein disclosed embodiments foresee that the mobility reference signals can be transmitted by at least one other network node than the network node that provides the measurement order.

The mobility measurement procedure may be used when the network needs to monitor the quality of several serving transmission beams and/or additional non-serving transmission beams in a pro-active manner, without awaiting an Observed transmission beam quality degradation that would trigger a regular mobility measurement session.

Embodiments relating to further details of configuring mobility measurements as performed by the network node 110a, 110b will now be disclosed.

There could be different ways of to determine that the parameters are valid for the at least two measurement sessions. According to an embodiment, the parameters are determined to be valid for the at least two consecutive measurement sessions of the mobility measurement procedure according previously received measurement reports, estimated or reported velocity of the wireless device 130, estimated or reported interference level at the wireless device 130, estimated or reported link quality between the network node 110a, 110b and the wireless device 130, and/or according to a notification from another network node 110a, 110b.

According to an embodiment, the measurement order indicates that the at least one of the parameters is to be used for mobility measurements during the at least two consecutive measurement sessions.

Since the mobility measurement procedure has parameters that are valid for at least two consecutive measurement sessions the measurement order can be regarded as a semi-persistent measurement order. In this respect, the term semi-persistent, as used for semi-persistent scheduling and semi-persistent measurement order, is meant to indicate that the mobility measurement procedure has parameters that are valid for a defined duration or parameters that are valid until further notice. This is in contrast to the baseline approach of transmitting individual measurement requests and mobility reference signals at each measurement session, and to the legacy approach in LTE of having a completely fixed, always-on RS transmission.

A semi-persistent measurement order is thus signaled to the wireless device 130. The MRS measurements can be used for continuous serving and/or candidate transmission beam quality monitoring for the wireless device 130, and semi-persistently scheduled MRS transmissions can thus be performed in these beams for the given wireless device 130.

The measurement order may specify the period of the measurements and the MRS sequence and T/F allocation parameters for the serving beam that remain constant during the configured measurement period.

The measurement order may also specify the reporting configuration by the wireless device 130.

The measurement order may be valid for a certain time period, or indefinite. In the latter case, the network node 110a, 110b can revoke the measurement order via downlink signaling. Hence, according to an embodiment the measurement order indicates that the at least one of the parameters is to be used for mobility measurements during consecutive measurement sessions until an updated measurement order is provided to the wireless device. According to aspects, the network node 10a, 110b is thus configured to override and/or reconfigure the measurement order by means of providing a new, or at least updated, measurement order, indicating changed parameters.

There could be different ways in which the measurement order is provided to the wireless device 130. According to an embodiment, the measurement order is provided to the wireless device 130 via a downlink control channel and comprises an identity indicator of the wireless device 130 or via radio resource control signalling.

Reference is now made to FIG. 4 illustrating methods for configuring mobility measurements as performed by the network node 110a, 110b according to further embodiments. Steps S102, S104, and S106 are performed as with reference to FIG. 3 and a repeated description thereof is therefore omitted. Parallel reference is continued to the signalling diagram of FIG. 2.

According to an embodiment, the wireless device 130 transmits a measurement report in accordance with the measurement order, and hence, according to this embodiment the network node 110a, 110b is configured to perform step S108:

S108: The network node 110a, 110b receives a measurement report of the mobility reference signals from the wireless device 130 in accordance with the measurement order. The measurement report reflects measurements performed by the wireless device 130 on the mobility reference signals.

For example, the wireless device 130 could report the MRS signal quality, a change from the previous measurement, and/or a "no change" flag. According to embodiments, the wireless device 130 reports a "no change" flag if the change since the previous report is smaller than a predetermined threshold.

According to further examples, the wireless device 130 could report flags indicating a suggestion to increase or decrease of measurement frequency e.g. if the wireless device 130 detects changes in its vehicular movement speed. According to aspects the wireless device 130 reports an increase or decrease of measurement frequency flag to its serving network node 110a, 110b if the wireless device 130 detects that the current measurement period is not well matched to its channel variation rate, or if that variation rate has changed.

Further, the reporting as received in step S108 may be omitted altogether if there are no significant changes to report. In this respect, the wireless device 130 can be configured with the thresholds (indicating how much quality change is allowed without sending a new report) and a maximum number of consecutive reports that may be omitted. If this number is exceeded, the wireless device 130 will anyway provide a measurement report (possibly indicating a no change) so that the network node 110a, 110b knows that the wireless device 130 is still there and that the wireless device 130 is performing mobility measurements as configured.

There can be different examples of parameters that the network node 110a, 110b obtains in step S102. According to an embodiment, the obtained parameters comprise parameters of the mobility reference signals and parameters of transmission beams in which the mobility reference signal are transmitted.

In this respect the parameters of the mobility reference signals could define of mobility reference signal transmission sequence, time/frequency resources for transmitting the mobility reference signal, mobility reference signal repetition period, reporting mode of measurement reports of the mobility reference signals, and/or report contents of measurement reports of the mobility reference signals.

The parameters of the mobility reference signals could define initial and/or final time slots and frequency resources where transmission of the mobility reference signals occurs The parameters of the mobility reference signals could define Beam identity (ID) or mobility reference signal sequence.

The parameters of the mobility reference signals could define a periodic mobility reference signal repetition period (if the transmission of the mobility reference signals is periodically repeated), or another transmission pattern (if the transmission of the mobility reference signals is aperiodic or otherwise follows a complex periodic pattern).

The parameters of the mobility reference signals could define the reporting period (if periodic reporting is desired) of the wireless device 130. If the configured reporting period is equal to the transmission period of the mobility reference signals, then the reporting period in the configuration could be replaced by a flag (or nothing at all, making this the default reporting mode). For event based reporting, the parameters of the mobility reference signals could define triggers, e.g. signal quality threshold(s), for such events.

The parameters of the mobility reference signals could define the reporting type of the wireless device 130. For example the reporting type could be, e.g. either Layer 1 (L1; Physical layer, PHY) based, Layer 2 (L2; Medium Access Control (MAC) based or Layer 3 (L3; RRC) based.

The parameters of the mobility reference signals could define the report contents such as signal quality reporting resolution, signal quality measure (e.g. Reference Signal Received Power (RSRP), Reference Signal Received Quality (RSRQ), Signal-to-Interference-plus-Noise Ratio (SINR), and/or number of beams to report (if more than one beam are activated for transmission of the mobility reference signals), etc.

The parameters of the mobility reference signals could define criteria for the wireless device 130 to omit measurement reports.

The parameters of the mobility reference signals could define instructions to the wireless device 130 for reporting changing channel conditions, e.g., vehicular speed or velocity.

Further in this respect, the parameters of the transmission beams could define beam direction, beam width, and/or beam identity of the transmission beams.

In some embodiment, if it is necessary or convenient for the network to change beam or mobility reference signal parameters, a reconfiguration order is sent to the wireless device 130. Hence, according to an embodiment the network node 110a, 110b is configured to perform steps S112, S114, S116:

S112: The network node 110a, 110b modifies at least one of the parameters. The at least one modified parameter can be modified based on the measurement report received in step S108.

S114: The network node 110a, 110b provides an updated measurement order to the wireless device 130 regarding the mobility measurement procedure. The updated measurement order comprises at least the modified parameter. The reconfiguration order could thus either carry all parameters or carry only the changed parameter values. For example, the T/F resources used for transmission of the mobility reference signals may be changed to accommodate other data or control signals.

S116: The network node 110a, 110b initiates transmission of the mobility reference signals to the wireless device 130 according to the at least one modified parameter.

Steps S112-S116 thus resemble steps S102-S106 as disclosed above.

In a related embodiment, the mobility reference signal parameters are varied over time according to configured rules, such as defined by a predetermined pattern, without any measurement order update comprising varied parameters being provided to the wireless device 130.

As another example, the measurement period may be changed by the network to adapt to a changed movement speed of the wireless device 130, as detected via uplink or downlink Doppler estimates, or to adapt to variations in interference. Thus, according to an embodiment the measurement report received in step S108 indicates at least one of a change of velocity of the wireless device 130, a change of interference level at the wireless device 130, and a change of link quality between the network node 110a, 110b and the wireless device 130.

Aspects of the modifying of the at least one of the parameters as performed in step S112 will now be disclosed.

According to a first embodiment the modifying in step S112 causes the parameters for mobility measurements to be used during only one measurement session when the measurement report indicates an increase in velocity or speed of the wireless device 130, an increase in interference level, and/or a decrease in link quality. That is, as disclosed above the parameters are to be used for two consecutive measurement sessions, but here the parameters are modified to be used only for one such measurement session. The transmission of mobility reference signals and the measurement rate thereof may thus be increased if measurement reports indicate that the link quality is close to a too poor quality threshold, or that the wireless device 130 is located in an area with frequent known link loss events. High variation in the reported signal quality could also trigger the network to increase the transmission of mobility reference signals and the measurement rate thereof. In this respect, the wireless device 130 may report a variance of several part-measurements of mobility reference signals, which may indicate to the network that the link quality varies a lot, even though the reported averages (so far) have not shown any great variation. Alternatively, the network node 110a, 110b can estimate such variance measures from the measurement reports it receives. High variance value may also trigger an increase of the measurement rate.

According to a second embodiment the modifying in step S112 causes transmission resources used for transmitting the mobility reference signals to the wireless device 130 to be increased when the measurement report indicates an increase in velocity of the wireless device 130, an increase in interference level, and/or a decrease in link quality. The transmission resources thus represent network resources, such as T/F resources, allocated for transmission of the mobility reference signals and/or more frequent transmission of the mobility reference signals.

According to a third embodiment the first embodiment is combined with the second embodiment.

According to a further embodiment the measurement rate adaptations are configured in the wireless device 130, so that the network node 110a, 110b does not have to reconfigure the wireless device 130 explicitly every time the measurement rate is changed. For example, mechanisms can be provided that enable the network node 110a, 110b to change the measurement rate arbitrarily without the network node 110a, 110b being bound to a rule that has been configured in the wireless device 130, and without the network node 110a, 110b having to reconfigure the wireless device 130 at every measurement rate change. One example of such a mechanism is for the network node 110a, 110b to indicate a (preconfigured) change in the measurement rate by switching from different mobility reference signals. In more detail, from its configuration the wireless device 130 would know what measurement rate that is associated with each mobility reference signal. Alternatively, each change between mobility reference signals could indicate a step in the measurement rate. For instance, every switch between mobility reference signals in a certain order would indicate a step in one direction (e.g. increased rate) while MRS switches in the opposite order would indicate a step in the other direction (e.g. decreased rate). As an example, let there be three mobility reference signals, denoted MRS1, MRS2, and MRS3, where each of the MRS1, MRS2, and MRS3 thus has embedded identity information. Then, a each change in the transmission order MRS1 followed by MRS2 followed by MRS3 followed by MRS1, etc. could indicate that the measurement rate is increased by a factor, whilst each change in the transmission order MRS3 followed by MRS2 followed by MRS1 followed by MRS, etc. could indicate that the measurement rate is decreased by a factor.

There are multiple alternatives for how long the semi-persistent configuration lasts, i.e., for how long the semi-persistent measurement order is valid, and what triggers a re-configuration of the measurement order.

As a default option, the measurement order is valid as long as the current circumstances do not imply the need for an update. For example, if the serving transmission beam remains constant in a static scenario, the measurement order remains valid until the scenario is no longer static.

In the case of an indefinite measurement order, if the monitoring of the current serving transmission beam is no longer required, the serving network node may signal a measurement termination order to the wireless device 130 and stop transmitting the associated mobility reference signals.

According to aspects, the measurement order is valid until a regular (full) mobility measurement procedure (as disclosed above, i.e., where the mobility reference signals are scheduled per-device, per measurement session) is triggered and/or a report is received by the network.

There could be a timer that is triggered when the first mobility reference signal is transmitted and when the timer expires the network stops the transmission of the mobility reference signals. The timer setting can be informed to the wireless device 130 as one configuration parameter. The wireless device 130 could request more mobility reference signals to be transmitted once the timer expires. Tinier settings can thus inform the wireless device 130 that the mobility measurement procedure has parameters that are valid for a defined duration. Hence, according to an embodiment the measurement order indicates that the at least one of the parameters is to be used for mobility measurements during consecutive measurement sessions during a time interval. The time interval starts upon the network node 110a, 110b transmits the mobility reference signals or when the wireless device 130 is expected to receive the transmitted mobility reference signals.

According to aspects, the serving network node keeps transmitting the mobility reference signals until it receives a notification from a neighbor network node that indicates completion of a successfully handover of the wireless device 130. This could also be an uplink notification (e.g. RRC message or uplink synchronization signal (USS) or via the physical random access channel (PRACH)) from the wireless device 130 representing a request to turn off transmissions of the mobility reference signals. Alternatively, the serving network node could receive an indication of failed handover of the wireless device 130 from the target network node. Hence, according to an embodiment the network node 110a, 110b is configured to perform step S110:

S110: The network node 110a, 110b receives a notification relating to failed handover of the wireless device 130 to another network node 110a, 110b. The notification triggers the at least one parameter to be modified. The modification could involve to extend transmission of the mobility reference signals.

According to an embodiment the parameters define multiple configurations for transmitting the mobility reference signals. The mobility reference signals could then be transmitted according to at least two of the multiple configurations, where, for example, the mobility reference signals are first to be transmitted according to one of the multiple configurations and then to be transmitted by another one of the multiple configurations, etc. That is, the measurement order may provide a set of multiple individual configurations for transmission and reporting of the mobility reference signals. As will be further disclosed below, the wireless device 130 could then select a particular configuration out of the set, based on an implicit criterion (as opposed to an explicit update command from the network). The criterion is selected to be unambiguous and to guarantee that the network and wireless device 130 are at all times operating according to compatible configuration assumptions. Examples of implicit reconfigurations will be provided next.

A first example of implicit reconfigurations is an event (e.g. a certain signal quality level or vehicular speed reported by the wireless device 130 to the network node 110a, 110b). If the reported parameter is lower or higher than a predetermined threshold, the wireless device 130 and the network node 110a, 110b switch to a different mobility reference signals measurement configuration. For example, the mobility reference signals could be transmitted more frequent or be extended in time if the SINR decreases (suggesting that the wireless device 130 is approaching the coverage area limit). Further, the mobility reference signal repetition period may be adapted based on the variability in the reported signal quality value or a reported variance of measurement values recorded by the wireless device 130.

A second example of implicit reconfigurations is the received mobility reference signal contents. The wireless device 130 may be configured to search for multiple mobility reference signal identities or types. A change in the received mobility reference signal identity or type could then trigger a switch to a different mobility reference signal measurement configuration in the wireless device 130. That is, here each mobility reference signal identity or type maps to a different one of the individual configurations in the set of multiple individual configurations.

A third example of implicit reconfigurations is concerned with aspects of the actual measurement reporting. For example, the reporting may be either periodic or event based.

A fourth example of implicit reconfigurations is the measurement report content. The measurement report content could indicate a signal quality measure (RSRP, RSRQ, SINR), a reporting period (if periodic reporting is used), trigger condition, or conditions, for event based reporting (e.g. signal quality threshold), number of transmission beams to report if more than one transmission beam are activated, and criteria for the wireless device 130 to omit a report.

A fifth example of implicit reconfigurations is the reporting type. The reporting type could be either RRC based or USS based.

Reference is now made to FIG. 5 illustrating a method for reporting mobility measurements as performed by the wireless device 130 according to an embodiment.

As disclosed above, the network node 110a, 110b in step S104 provides a measurement order to the wireless device 130. It is here assumed that the wireless device 130 receives the measurement order and thus is configured to perform step S202:

S202: The wireless device 130 receives the measurement order from the network node 110a, 110b. As disclosed above, the measurement order regards a mobility measurement procedure. As disclosed above, the measurement order comprises at least one parameter to be used for the mobility measurement procedure. As disclosed above, the at least one parameter is valid for at least two consecutive measurement sessions of the mobility measurement procedure.

As disclosed above, the network node 110a, 110b in step S106 initiates transmission of mobility reference signals to the wireless device 130. It is here assumed that the wireless device 130 receives the mobility reference signals and thus is configured to perform step S204:

S204: The wireless device 130 receives the mobility reference signals from the network node 110a, 110b according to the at least one parameter during the at least two consecutive measurement sessions.

Embodiments relating to further details of reporting mobility measurements as performed by the wireless device 130 will now be disclosed.

Reference is now made to FIG. 6 illustrating methods for reporting mobility measurements as performed by the wireless device 130 according to further embodiments. Steps S202 and S204 are performed as with reference to FIG. 5 and a repeated description thereof is therefore omitted. Parallel reference is continued to the signalling diagram of FIG. 2.

Upon having received the mobility reference signals from the network node 110a, 110b the wireless device 130 can perform measurements on the mobility reference signals and provide a report thereof to the network node 110a, 110b. According to an embodiment the wireless device 130 is thus configured to perform step S210:

S210: The wireless device 130 provides a measurement report of the received mobility reference signals to the network node 110a, 110b. The measurement report is provided according to measurement order information as provided in the measurement order.

As an alternative, the measurement report is provided according reporting configuration (e.g., RRC configuration) that is given once and not repeated for every measurement order sent.

There can be different examples of measurement reports. According to an embodiment the measurement report comprises a signal quality value of the received mobility reference signals, an indication of change in signal quality compared to a previous signal quality value, and/or an indication of no change in signal quality compared to a previous signal quality value.

Further, according to an embodiment the measurement report indicates a change of velocity of the wireless device 130, a change of interference level, and/or a change of link quality.

According to aspects, the measurement order implies an associated semi-persistent uplink grant for the wireless device 130 to transmit the measurement report. The measurement order can thus indicate an uplink grant for providing the measurement report to be valid for each of at least two consecutive measurement sessions of the mobility measurement procedure.

In this respect, the measurement rate and the reporting rate may be independent, e.g. such that the transmissions of the mobility reference signals (and thus at least the potential measurement rate) may be semi-persistently scheduled, whilst the reporting of the mobility reference signals is entirely event triggered (e.g. based on thresholds evaluated by the wireless device 130).

As disclosed above, according to an embodiment the parameters define multiple configurations for transmitting the mobility reference signals, and the mobility reference signals are transmitted in at least two of the multiple configurations. The wireless device 13o is then configured to perform step S208:

S208: The wireless device 130 selects for which of the multiple configurations to provide the measurement report.

Further, according to some aspects the wireless device 130 is configured to propose changes in the measurement period of the mobility reference signals. The wireless device 130 can therefore be configured to estimate the vehicular speed, compare the result to the configured measurement period, and alert the network node 110a, 110b if the reporting period should be modified.

Further, according to some aspects, the wireless device 130 is configured to estimate and report the variance of the partial measurements to allow the network node 110a, 110b to adapt the rate at which the mobility reference signals are transmitted.

Further, according to some aspects, the wireless device 130 is configured to request a modified measurement rate if the wireless device 130 has knowledge about quality requirements of applications run in the wireless device 130 which quality requirements the network is not aware of.

The wireless device 130 can be configured to refrain from providing the measurement report if certain conditions are fulfilled. Hence, according to an embodiment the wireless device 130 is configured to perform step S206:

S206: The wireless device 130 determines not to provide a measurement report of the received mobility reference signals to the network node 110a, 110b when a signal quality value of the received mobility reference signals differs from less than a predetermined threshold value compared to a previous signal quality value.

Figure 10:
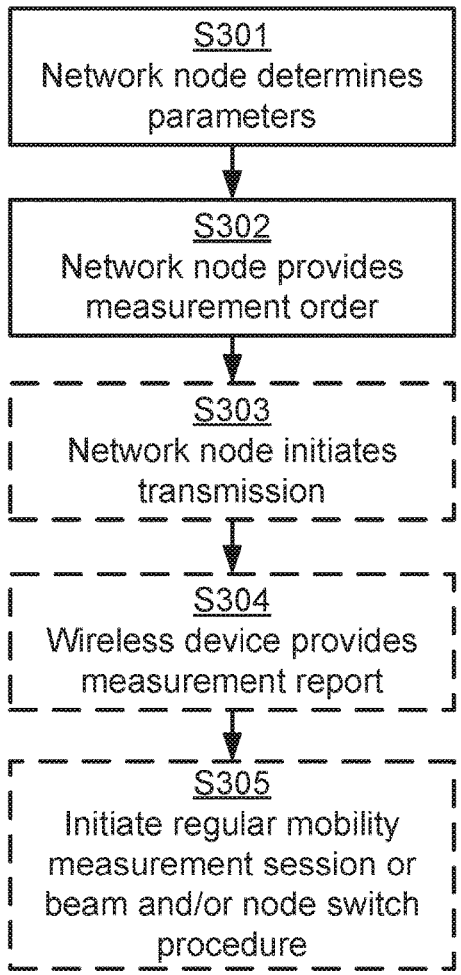

One particular embodiment for configuring mobility measurements and for reporting mobility measurements based on at least some of the above disclosed embodiments will now be disclosed in detail with reference to the flowchart of FIG. 10.

S301: Parameters of transmission beams and parameters of the mobility reference signals are device-specific and are determined by the network node 110a, 110b in traditional ways. The beam direction of the transmission beams is based on the direction of the current serving beam and its width based on the target minimum SINR level to be maintained. The mobility reference signal period is based on channel fading variation rate (e.g. the vehicular speed or Doppler estimate) of the wireless device 130. The variation rate is estimated by the network node 110a, 110b using uplink channel information, or reported by the wireless device 130 from downlink measurements. One way to implement step S301 is to perform step S102.

S302: The network node 110a, 110b provides the measurement order via the downlink control channel, using the wireless device identity indicator or a special-purpose identity indicator, or via RRC signaling. The measurement order either includes a duration parameter, or it is valid indefinitely (i.e. until further notice). The measurement order is received by the wireless device 130. One way to implement step S302 is to perform step S104 and step S202.

S303: The network node 110a, 110b initiates transmission of the mobility reference signals such that the mobility reference signals are transmitted in a periodic manner from the node currently serving the wireless device 130 and using the chosen parameters. The mobility reference signals are received by the wireless device 130. One way to implement step S303 is to perform step S106 and step S204.

S304: The wireless device 130 provides a measurement report of the received mobility reference signals to the network node 110a, 110b according to the requested reporting mode. The network node 110a, 110b receives the measurement report of the mobility reference signals from the wireless device 130. One way to implement step S304 is to perform step S108 and step S210.

S305: If the measurement report (the most recent one by itself or in combination with previous measurement reports), indicates a link degradation, the the network node 110a, 110b initiates a regular mobility measurement session. This may include activating mobility reference signals in additional candidate transmission beams and in other nodes, e.g. based on the position of the wireless device 130, and requesting the wireless device 130 to measure and report mobility reference signalquality in the candidate transmission beams. Based on the measurement reports, a beam and/or serving network node switch procedure can be initiated. One way to implement step S305 is to perform steps S112, S114, S116.

Figure 7A:
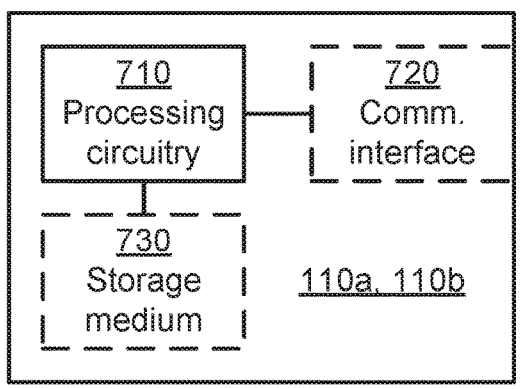
FIG. 7a is a schematic diagram showing functional units of a network node according to an embodiment.

FIG. 7a schematically illustrates, in terms of a number of functional units, the components of a network node 110a, 110b according to an embodiment. Processing circuitry 710 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 730. The processing circuitry 710 may further be provided as at least one application specific integrated circuit (ASIC), or field programmable gate array (FPGA).

Particularly, the processing circuitry 710 is configured to cause the network node 110a, 110b to perform a set of operations, or steps, S102-S116, as disclosed above. For example, the storage medium 730 may store the set of operations, and the processing circuitry 710 may be configured to retrieve the set of operations from the storage medium 730 to cause the network node 110a, 110b to perform the set of operations. The set of operations may be provided as a set of executable instructions. Thus the processing circuitry 710 is thereby arranged to execute methods as herein disclosed.

The storage medium 230 may also comprise persistent storage, which, for example, can be any single one or combination of magnetic memory, optical memory, solid state memory or even remotely mounted memory.

The network node 110a, 110b may further comprise a communications interface 720 for communications at least with a wireless device 130. As such the communications interface 720 may comprise one or more transmitters and receivers, comprising analogue and digital components and a suitable number of antennas for wireless communications and ports for wireline communications.

The processing circuitry 710 controls the general operation of the network node 110a, 110b e.g. by sending data and control signals to the communications interface 720 and the storage medium 730, by receiving data and reports from the communications interface 720, and by retrieving data and instructions from the storage medium 730. Other components, as well as the related functionality, of the network node 110a, 110b are omitted in order not to obscure the concepts presented herein.

Figure 7B:
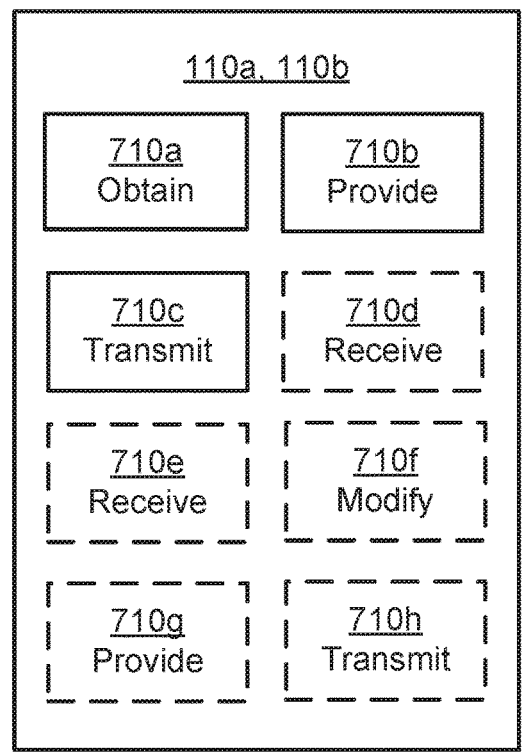
FIG. 7b is a schematic diagram showing functional modules of a network node according to an embodiment.

FIG. 7b schematically illustrates, in terms of a number of functional modules, the components of a network node 110a, 110b according to an embodiment. The network node 110a, 110b of FIG. 7b comprises a number of functional modules; an obtain module 710a configured to perform step S102, a provide module 710b configured to perform step S104, and a transmit module 710c configured to perform step S106. The network node 110a, 110b of FIG. 7b may further comprise a number of optional functional modules, such as any of a receive module 710d configured to perform step S108, a receive module 710e configured to perform step S110, a modify module 710f configured to perform step S112, a provide module 710g configured to perform step S114, and a transmit module 710h configured to perform step S116.

In general terms, each functional module 710a-710h may be implemented in hardware or in software. Preferably, one or more or all functional modules 710a-710h may be implemented by the processing circuitry 710, possibly in cooperation with functional units 720 and/or 730. The processing circuitry 710 may thus be arranged to from the storage medium 230 fetch instructions as provided by a functional module 710a-710h and to execute these instructions, thereby performing any steps as disclosed herein.

The network node 110a, 110b may be provided as a standalone device or as a part of at least one further device. For example, the network node 110a, 110b may be provided in a radio access network node. Alternatively, functionality of the network node 110a, 110b may be distributed between at least two devices, or nodes. These at least two nodes, or devices, may either be part of to the same network part (such as a radio access network or a core network) or may be spread between at least two such network parts. In general terms, instructions that are required to be performed in real time may be performed in a device, or node, operatively closer to the radio access network node than instructions that are not required to be performed in real time.

Thus, a first portion of the instructions performed by the network node 110a, 110b may be executed in a first device, and a second portion of the of the instructions performed by the network node 110a, 110b may be executed in a second device; the herein disclosed embodiments are not limited to any particular number of devices on which the instructions performed by the network node 110a, 110b may be executed. Hence, the methods according to the herein disclosed embodiments are suitable to be performed by a network node 110a, 110b residing in a cloud computational environment. Therefore, although a single processing circuitry 710 is illustrated in FIG. 7a and the processing circuitry 710 may be distributed among a plurality of devices, or nodes. The same applies to the functional modules of FIG. 7b and the computer program 920a of FIG. 9 (see below).

Figure 8B:
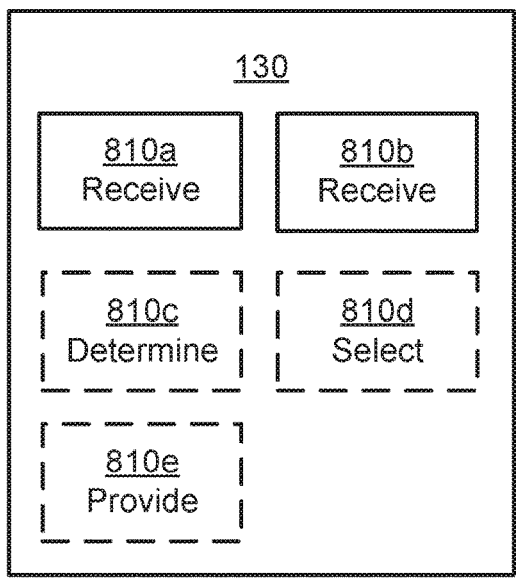
FIG. 8b is a schematic diagram showing functional modules of a wireless device according to an embodiment.
Figure 8A:
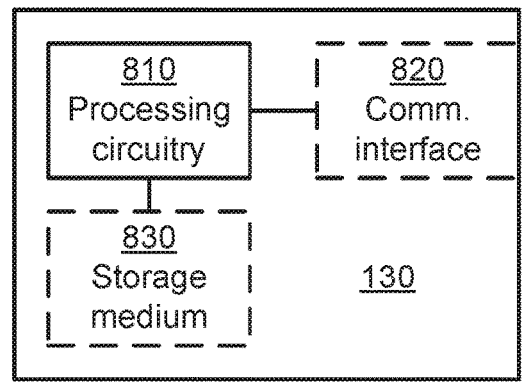
FIG. 8a is a schematic diagram showing functional units of a wireless device according to an embodiment.

FIG. 8a schematically illustrates, in terms of a number of functional units, the components of a wireless device 130 according to an embodiment. Processing circuitry 810 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 830. The processing circuitry 810 may further be provided as at least one application specific integrated circuit (ASIC), or field programmable gate array (FPGA).

Particularly, the processing circuitry 810 is configured to cause the wireless device 130 to perform a set of operations, or steps, S202-S210, as disclosed above. For example, the storage medium 830 may store the set of operations, and the processing circuitry 810 may be configured to retrieve the set of operations from the storage medium 830 to cause the wireless device 130 to perform the set of operations. The set of operations may be provided as a set of executable instructions. Thus the processing circuitry 810 is thereby arranged to execute methods as herein disclosed.

The storage medium 830 may also comprise persistent storage, which, for example, can be any single one or combination of magnetic memory, optical memory, solid state memory or even remotely mounted memory.

The wireless device 130 may further comprise a communications interface 820 for communications at least with a network node 110a, 110b. As such the communications interface 820 may comprise one or more transmitters and receivers, comprising analogue and digital components and a suitable number of antennas for wireless communications and ports for wireline communications.

The processing circuitry 810 controls the general operation of the wireless device 130 e.g. by sending data and control signals to the communications interface 820 and the storage medium 330, by receiving data and reports from the communications interface 820, and by retrieving data and instructions from the storage medium 830. Other components, as well as the related functionality, of the wireless device 130 are omitted in order not to obscure the concepts presented herein.

FIG. 8b schematically illustrates, in terms of a number of functional modules, the components of a wireless device 130 according to an embodiment. The wireless device 130 of FIG. 8b comprises a number of functional modules; a receive module 810a configured to perform step S202, and a receive module 810b configured to perform step S204. The wireless device 130 of FIG. 8b may further comprises a number of optional functional modules, such as any of a determine module 810c configured to perform step S206, a select module 810d configured to perform step S208, and a provide module 810e configured to perform step S210.

In general terms, each functional module 810a-810e may be implemented in hardware or in software. Preferably, one or more or all functional modules 810a-810e may be implemented by the processing circuitry 810, possibly in cooperation with functional units 820 and/or 830. The processing circuitry 810 may thus he arranged to from the storage medium 830 fetch instructions as provided by a functional module 810a-810e and to execute these instructions, thereby performing any steps as disclosed herein.

Figure 9:
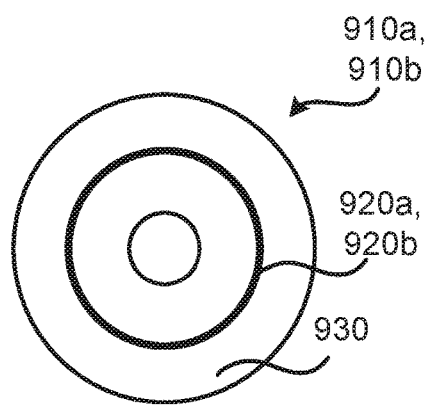
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 710 and thereto operatively coupled entities and devices, such as the communications interface 720 and the storage medium 730, to execute methods according to embodiments described herein. The computer program 920a and/or computer program product 910a may thus provide means for performing any steps of the network node 110a, 110b as herein disclosed. On this computer readable means 930, a computer program 920b can be stored, which computer program 920b can cause the processing circuitry 810 and thereto operatively coupled entities and devices, such as the communications interface 820 and the storage medium 830, to execute methods according to embodiments described herein. The computer program 920b and/or computer program product 910b may thus provide means for performing any steps of the wireless device 130 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method for configuring mobility measurements, the method being performed by a network node, the method comprising:

obtaining parameters to be used for a mobility measurement procedure, wherein the parameters are valid for at least two consecutive measurement sessions of the mobility measurement procedure;

providing a measurement order to a wireless device regarding the mobility measurement procedure, wherein the measurement order comprises at least one of the parameters;

initiating transmission of mobility reference signals to the wireless device according to the parameters such that the mobility reference signals are transmitted during said at least two consecutive measurement sessions;

modifying at least one of the parameters;

providing an updated measurement order to the wireless device regarding the mobility measurement procedure, wherein the updated measurement order comprises at least the modified parameter; and initiating transmission of the mobility reference signals to the wireless device according to the at least one modified parameter.

2. The method according to claim 1, wherein the parameters are determined to be valid for the at least two consecutive measurement sessions of the mobility measurement procedure according to at least one of previously received measurement reports, velocity of the wireless device, interference level at the wireless device, link quality between the network node and the wireless device, and a notification from another network node.

3. The method according to claim 1, wherein the measurement order indicates that the at least one of the parameters is to be used for mobility measurements during said at least two consecutive measurement sessions.

4. The method according to claim 1, wherein the measurement order indicates that the at least one of the parameters is to be used for mobility measurements during consecutive measurement sessions until an updated measurement order is provided to the wireless device.

5. The method according to claim 1, wherein the measurement order indicates that the at least one of the parameters is to be used for mobility measurements during consecutive measurement sessions during a time interval, the time interval starting upon a first of the mobility reference signals having been transmitted.

6. The method according to claim 1, wherein the parameters define multiple configurations for transmitting the mobility reference signals, and wherein the mobility reference signals are transmitted according to at least two of said multiple configurations.

7. The method according to claim 1, wherein the measurement order is provided to the wireless device via a downlink control channel and comprises an identity indicator of the wireless device or via radio resource control signalling.

8. The method according to claim 1, further comprising:
receiving a measurement report of the mobility reference signals from the wireless device in accordance with the measurement order.

9. The method according to claim 8, further comprising:
modifying at least one of the parameters;

providing an updated measurement order to the wireless device regarding the mobility measurement procedure, wherein the updated measurement order comprises at least the modified parameter; and initiating transmission of the mobility reference signals to the wireless device according to the at least one modified parameter, and wherein the at least one modified parameter is modified based on the received measurement report.

10. The method according to claim 9, wherein the measurement report indicates at least one of a change of velocity of the wireless device, a change of interference level at the wireless device, and a change of link quality between the network node and the wireless device.

11. The method according to claim 1, wherein said modifying causes the parameters for mobility measurements to be used during only one measurement session when the measurement report indicates at least one of an increase in velocity of the wireless device, an increase in interference level, and a decrease in link quality.

12. The method according to claim 1, wherein said modifying causes transmission resources used for transmitting the mobility reference signals to the wireless device to increase when the measurement report indicates at least one of an increase in velocity of the wireless device, an increase in interference level, and a decrease in link quality.

13. The method according to claim 1, further comprising:
receiving a notification relating to failed handover of the wireless device to another network node; and wherein the notification triggers the at least one parameter to be modified.

14. The method according to claim 1, wherein the parameters are varied over time according to configured rules, such as a predetermined pattern, and without any measurement order update comprising varied parameters being provided to the wireless device.

15. The method according to claim 1, wherein the obtained parameters comprise parameters of the mobility reference signals and parameters of transmission beams in which the mobility reference signal are transmitted.

16. The method according to claim 15, wherein the parameters of the mobility reference signals define at least one of mobility reference signal transmission sequence, time/frequency resources for transmitting the mobility reference signal, mobility reference signal repetition period, reporting mode of measurement reports of the mobility reference signals, and report contents of measurement reports of the mobility reference signals.

17. The method according to claim 15, wherein the parameters of the transmission beams define at least one of beam direction, beam width, and beam identity of the transmission beams.

18. A method for reporting mobility measurements, the method being performed by a wireless device, the method comprising:
receiving a measurement order from a network node regarding a mobility measurement procedure, wherein the measurement order comprises at least one parameter to be used for the mobility measurement procedure, wherein the at least one parameter is valid for at least two consecutive measurement sessions of the mobility measurement procedure;

receiving the mobility reference signals from the network node according to the at least one parameter during said at least two consecutive measurement sessions;

receiving an updated measurement order from the network node regarding the mobility measurement procedure, wherein the updated measurement order comprises at least a modified parameter; and receiving the mobility reference signals from the network node according to the at least one modified parameter.

19. The method according to claim 18, further comprising:
providing a measurement report of the received mobility reference signals to the network node according to measurement order information.

20. The method according to claim 19, wherein the measurement report comprises at least one of a signal quality value of the received mobility reference signals, an indication of change in signal quality compared to a previous signal quality value, and an indication of no change in signal quality compared to a previous signal quality value.

21. The method according to claim 19, wherein the measurement report indicates at least one of a change of velocity of the wireless device, a change of interference level, and a change of link quality.

22. The method according to claim 19, wherein the measurement order indicates an uplink grant for providing the measurement report to be valid for each of at least two consecutive measurement sessions of the mobility measurement procedure.

23. The method according to claim 19, wherein the parameters define multiple configurations for transmitting the mobility reference signals, wherein the mobility reference signals are transmitted in said multiple configurations, the method further comprising:
   selecting for which of the multiple configurations to provide the measurement report.

24. The method according to claim 18, further comprising:
   determining not to provide a measurement report of the received mobility reference signals to the network node when a signal quality value of the received mobility reference signals differs less than a predetermined threshold value compared to a previous signal quality value.

25. A network node for configuring mobility measurements, the network node comprising processing circuitry, the processing circuitry being configured to cause the network node to:
   obtain parameters to be used for a mobility measurement procedure, wherein the parameters are valid for at least two consecutive measurement sessions of the mobility measurement procedure;
   provide a measurement order to a wireless device regarding the mobility measurement procedure, wherein the measurement order comprises at least one of the parameters; and
   initiate transmission of mobility reference signals to the wireless device according to the parameters such that the mobility reference signals are transmitted during said at least two consecutive measurement session;
   modify at least one of the parameters;
   provide an updated measurement order to the wireless device regarding the mobility measurement procedure, wherein the updated measurement order comprises at least the modified parameter; and
   initiate transmission of the mobility reference signals to the wireless device according to the at least one modified parameter.

26. A network node for configuring mobility measurements, the network node comprising:
   processing circuitry; and
   a computer program product storing instructions that, when executed by the processing circuitry, causes the network node to:
      obtain parameters to be used for a mobility measurement procedure, wherein the parameters are valid for at least two consecutive measurement sessions of the mobility measurement procedure;
      provide a measurement order to a wireless device regarding the mobility measurement procedure, wherein the measurement order comprises at least one of the parameters;
      initiate transmission of mobility reference signals to the wireless device according to the parameters such that the mobility reference signals are transmitted during said at least two consecutive measurement sessions;
      modify at least one of the parameters;
      provide an updated measurement order to the wireless device regarding the mobility measurement procedure, wherein the updated measurement order comprises at least the modified parameter; and
      initiate transmission of the mobility reference signals to the wireless device according to the at least one modified parameter.

27. A network node for configuring mobility measurements, the network node comprising:
   an obtain module configured to obtain parameters to be used for a mobility measurement procedure, wherein the parameters are valid for at least two consecutive measurement sessions of the mobility measurement procedure;
   a provide module configured to provide a measurement order to a wireless device regarding the mobility measurement procedure, wherein the measurement order comprises at least one of the parameters;
   a transmit module configured to initiate transmission of mobility reference signals to the wireless device according to the parameters such that the mobility reference signals are transmitted during said at least two consecutive measurement sessions; and
   a modify module configured to modify at least one of the parameters,
   wherein:
   the provide module is further configured to provide an updated measurement order to the wireless device regarding the mobility measurement procedure, wherein the updated measurement order comprises at least the modified parameter; and
   the transmit module is further configured to initiate transmission of the mobility reference signals to the wireless device according to the at least one modified parameter.

28. A wireless device for reporting mobility measurements, the wireless device comprising processing circuitry, the processing circuitry being configured to cause the wireless device to:
   receive a measurement order from a network node regarding a mobility measurement procedure, wherein the measurement order comprises at least one parameter to be used for the mobility measurement procedure, wherein the at least one parameter is valid for at least two consecutive measurement sessions of the mobility measurement procedure;
   receive the mobility reference signals from the network node according to the at least one parameter during said at least two consecutive measurement sessions;
   receive an updated measurement order from the network node regarding the mobility measurement procedure, wherein the updated measurement order comprises at least a modified parameter; and
   receive the mobility reference signals from the network node according to the at least one modified parameter.

29. A wireless device for reporting mobility measurements, the wireless device comprising:
   processing circuitry; and
   a computer program product storing instructions that, when executed by the processing circuitry, causes the wireless device to:
      receive a measurement order from a network node regarding a mobility measurement procedure, wherein the measurement order comprises at least one parameter to be used for the mobility measurement procedure, wherein the at least one parameter is valid for at least two consecutive measurement sessions of the mobility measurement procedure;

receive the mobility reference signals from the network node according to the at least one parameter during said at least two consecutive measurement sessions;

receive an updated measurement order from the network node regarding the mobility measurement procedure, wherein the updated measurement order comprises at least a modified parameter; and receive the mobility reference signals from the network node according to the at least one modified parameter.

30. A wireless device for reporting mobility measurements, the wireless device comprising:

a receive module configured to receive a measurement order from a network node regarding a mobility measurement procedure, wherein the measurement order comprises at least one parameter to be used for the mobility measurement procedure, wherein the at least one parameter is valid for at least two consecutive measurement sessions of the mobility measurement procedure;

a receive module configured to receive the mobility reference signals from the network node according to the at least one parameter during said at least two consecutive measurement sessions, wherein the receive module configured to receive the measurement order is further configured to receive an updated measurement order from the network node regarding the mobility measurement procedure, wherein the updated measurement order comprises at least a modified parameter; and wherein the receive module configured to receive the mobility reference signals is further configured to receive the mobility reference signals from the network node according to the at least one modified parameter.

31. A nontransitory computer readable storage medium comprising a computer program for configuring mobility measurements, the computer program comprising computer code which, when run on processing circuitry of a network node, causes the network node to:

obtain parameters to be used for a mobility measurement procedure, wherein the parameters are valid for at least two consecutive measurement sessions of the mobility measurement procedure;

provide a measurement order to a wireless device regarding the mobility measurement procedure, wherein the measurement order comprises at least one of the parameters; and transmit the mobility reference signals to the wireless device according to the parameters such that the mobility reference signals are transmitted during said at least two consecutive measurement session;

modify at least one of the parameters;

provide an updated measurement order to the wireless device regarding the mobility measurement procedure, wherein the updated measurement order comprises at least the modified parameter; and initiate transmission of the mobility reference signals to the wireless device according to the at least one modified parameter.

32. A nontransitory computer readable storage medium comprising a computer program for reporting mobility measurements, the computer program comprising computer code which, when run on processing circuitry of a wireless device, causes the wireless device to:

receive a measurement order from a network node regarding a mobility measurement procedure, wherein the measurement order comprises at least one parameter to be used for the mobility measurement procedure, wherein the at least one parameter is valid for at least two consecutive measurement sessions of the mobility measurement procedure;

receive the mobility reference signals from the network node according to the at least one parameter during said at least two consecutive measurement session;

receive an updated measurement order from the network node regarding the mobility measurement procedure, wherein the updated measurement order comprises at least a modified parameter; and receive the mobility reference signals from the network node according to the at least one modified parameter.

* * * * *

UNITED STATES PATENT AND TRADEMARK OFFICE
CERTIFICATE OF CORRECTION

PATENT NO. : 10,284,315 B2
APPLICATION NO. : 15/525314
DATED : May 7, 2019
INVENTOR(S) : Reial et al.

Page 1 of 1

It is certified that error appears in the above-identified patent and that said Letters Patent is hereby corrected as shown below:

In the Specification

In Column 4, Line 10, delete "riot" and insert -- not --, therefor.

In Column 6, Line 59, delete "10b" and insert -- 110b --, therefor.

In Column 7, Line 12, delete "140n," and insert -- 140b, --, therefor.

In Column 8, Line 21, delete "10a," and insert -- 110a, --, therefor.

In Column 12, Line 4, delete "Tinier" and insert -- Timer --, therefor.

In Column 14, Line 5, delete "according reporting" and insert -- according to reporting --, therefor.

In Column 14, Line 37, delete "13o" and insert -- 130 --, therefor.

In Column 16, Line 51, delete "to from" and insert -- to form --, therefor.

In Column 16, Line 61, delete "of to the" and insert -- of the --, therefor.

In Column 18, Line 8, delete "he arranged to from" and insert -- be arranged to form --, therefor.

In the Claims

In Column 21, Line 38, in Claim 25, delete "session;" and insert -- sessions; --, therefor.

In Column 24, Line 11, in Claim 31, delete "session;" and insert -- sessions; --, therefor.

In Column 24, Line 33, in Claim 32, delete "session;" and insert -- sessions; --, therefor.

Signed and Sealed this
Twenty-seventh Day of August, 2019

Andrei Iancu
*Director of the United States Patent and Trademark Office*